United States Patent
Kohler et al.

(10) Patent No.: US 10,062,532 B2
(45) Date of Patent: Aug. 28, 2018

(54) METHOD AND CIRCUIT ARRANGEMENT FOR THE ACTIVATION AND PARAMETERIZATION OF AN ELECTRICAL DEVICE

(71) Applicant: Balluff GmbH, Neuhausen a.d.F. (DE)

(72) Inventors: Matthias Kohler, Hondrich (CH); Simon Mahler, Bern (CH); Tobias Reissing, Nidau (CH)

(73) Assignee: Balluff GmbH, Neuhausen a.d.F. (DE)

( * ) Notice: Subject to any disclaimer, the term of this patent is extended or adjusted under 35 U.S.C. 154(b) by 932 days.

(21) Appl. No.: 14/283,495

(22) Filed: May 21, 2014

(65) Prior Publication Data
US 2014/0346895 A1 Nov. 27, 2014

(30) Foreign Application Priority Data
May 24, 2013 (DE) .......................... 10 2013 008 807

(51) Int. Cl.
| | |
|---|---|
| *H01H 47/00* | (2006.01) |
| *G05B 9/02* | (2006.01) |
| *G05B 19/042* | (2006.01) |

(52) U.S. Cl.
CPC .............. *H01H 47/00* (2013.01); *G05B 9/02* (2013.01); *G05B 19/042* (2013.01); *Y10T 307/766* (2015.04)

(58) Field of Classification Search
CPC ...... H01H 47/00; H03K 17/945; H03K 17/96; Y10T 307/766
(Continued)

(56) References Cited

U.S. PATENT DOCUMENTS

| | | | |
|---|---|---|---|
| 6,452,617 B1 * | 9/2002 | Bates ...................... | G06F 3/038 715/744 |
| 8,412,361 B1 * | 4/2013 | Reynolds ............... | A61B 17/00 700/79 |

(Continued)

FOREIGN PATENT DOCUMENTS

| | | |
|---|---|---|
| DE | 100 35 592 A1 | 1/2002 |
| DE | 10 2004 020 827 A1 | 11/2005 |

(Continued)

OTHER PUBLICATIONS

German Examination Report dated May 12, 2014 in German Application No. 10 2013 008 807.0 with English translation of relevant parts.

*Primary Examiner* — Rexford Barnie
*Assistant Examiner* — Joseph Inge
(74) *Attorney, Agent, or Firm* — Collard & Roe, P.C.

(57) ABSTRACT

A method for the activation of an electrical device (50), which comprises at least one electrical component (30) whose values are mechanically variable by rotating or displacing is characterized by the following steps: at least one first and one second threshold value are predetermined, which are adjustable by rotating, touching, displacing or other manipulations; a time window starts after reaching the first threshold value by manipulation of the electrical component (30); if the second threshold value is reached by manipulation of the electrical component (30) within the time window, an activation signal is output; and if the second threshold value is not reached within the predeterminable time window by manipulation of the electrical component (30), the activation process is terminated.

10 Claims, 6 Drawing Sheets

(58) Field of Classification Search
USPC .......................................................... 307/116
See application file for complete search history.

(56) References Cited

U.S. PATENT DOCUMENTS

| | | | | |
|---|---|---|---|---|
| 2007/0024595 A1* | 2/2007 | Baker | ................ | G06F 3/03547 345/173 |
| 2013/0307799 A1* | 11/2013 | Hauf | ................ | G05B 19/0423 345/173 |

FOREIGN PATENT DOCUMENTS

| | | |
|---|---|---|
| DE | 20 2004 021 345 U1 | 10/2007 |
| DE | 10 2010 007 455 A1 | 8/2011 |
| DE | 10 2011 077 170 A1 | 12/2012 |
| DE | 10 2011 086 320 A1 | 5/2013 |

* cited by examiner

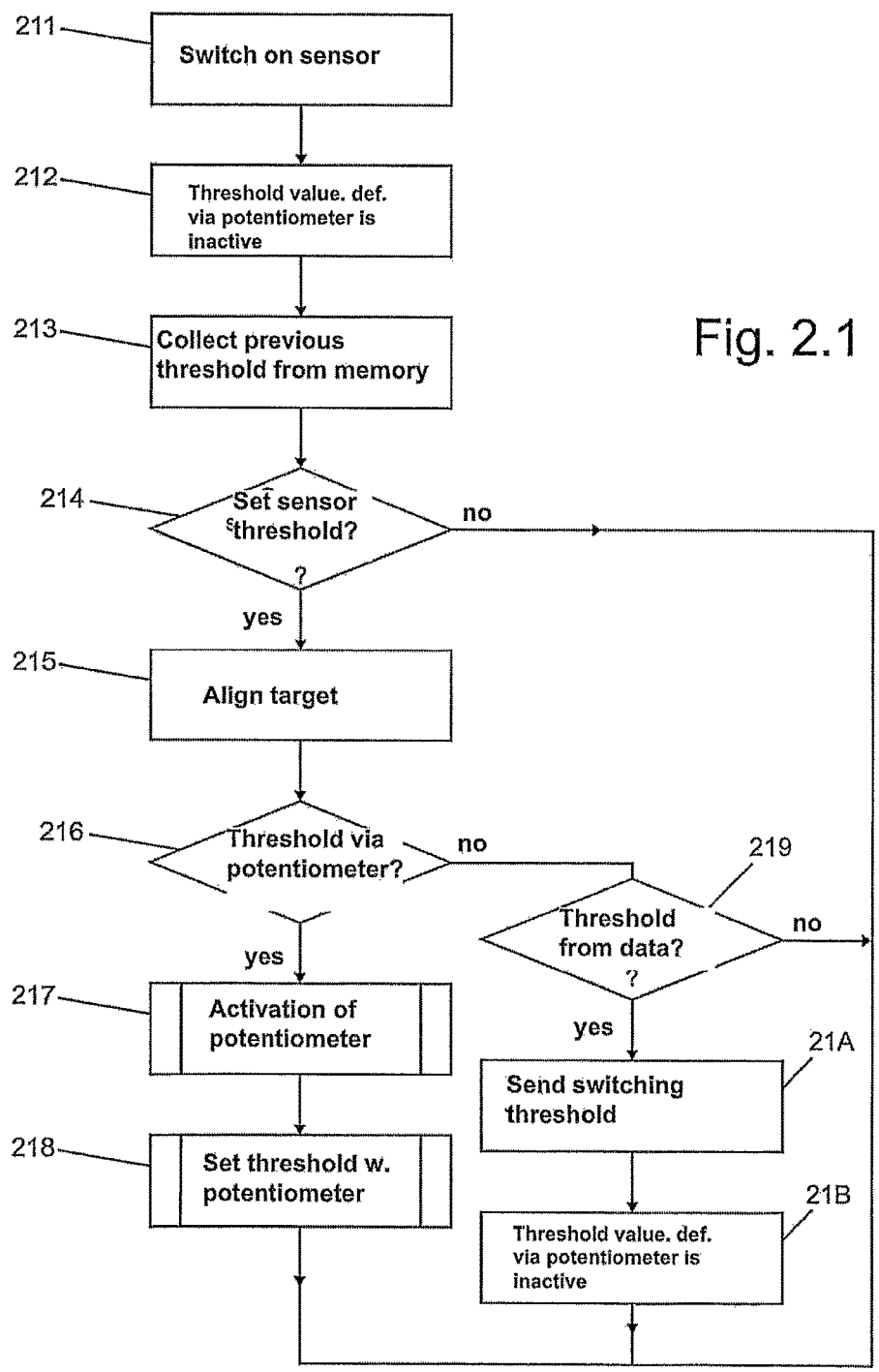
Fig. 2.1

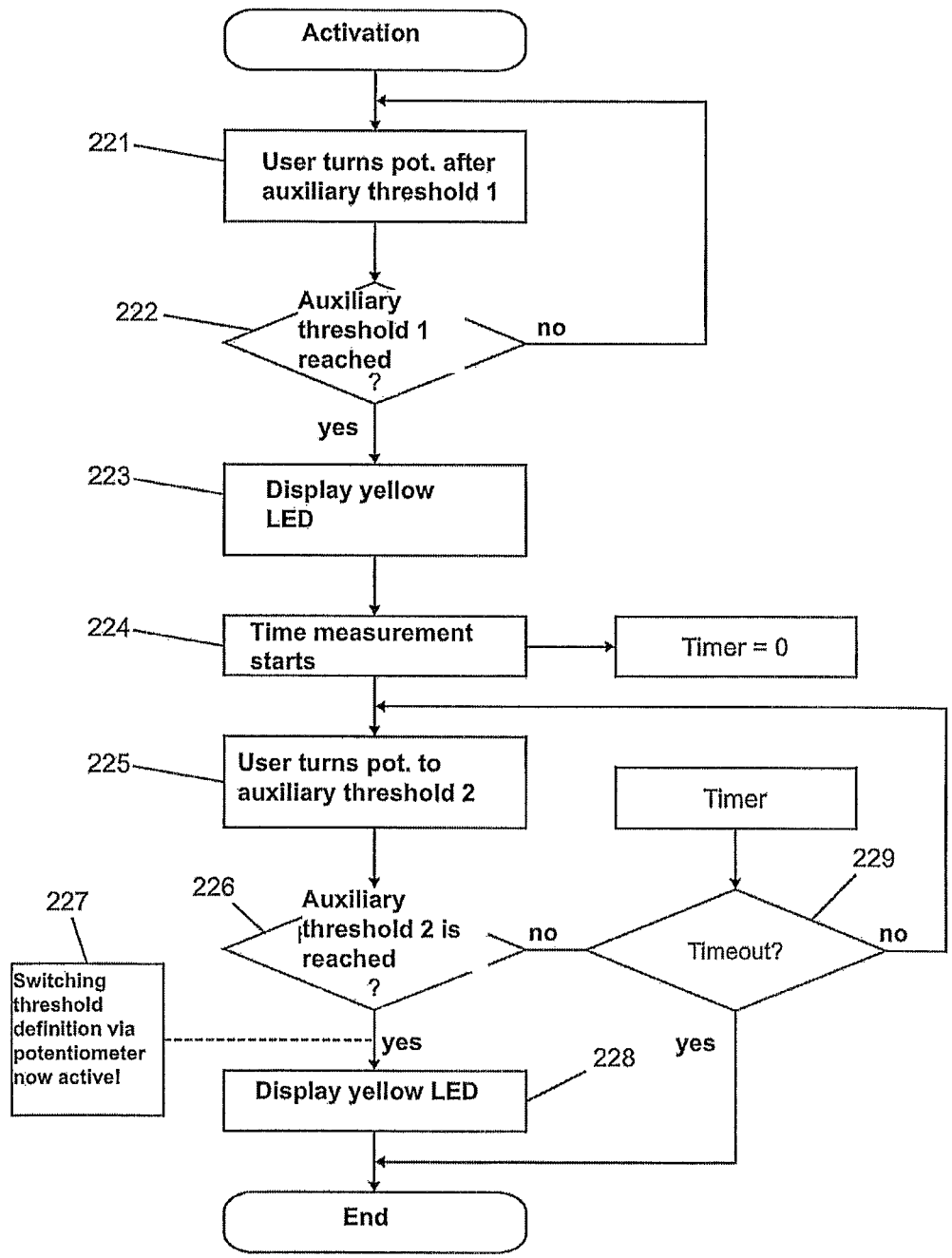
Fig. 2.2

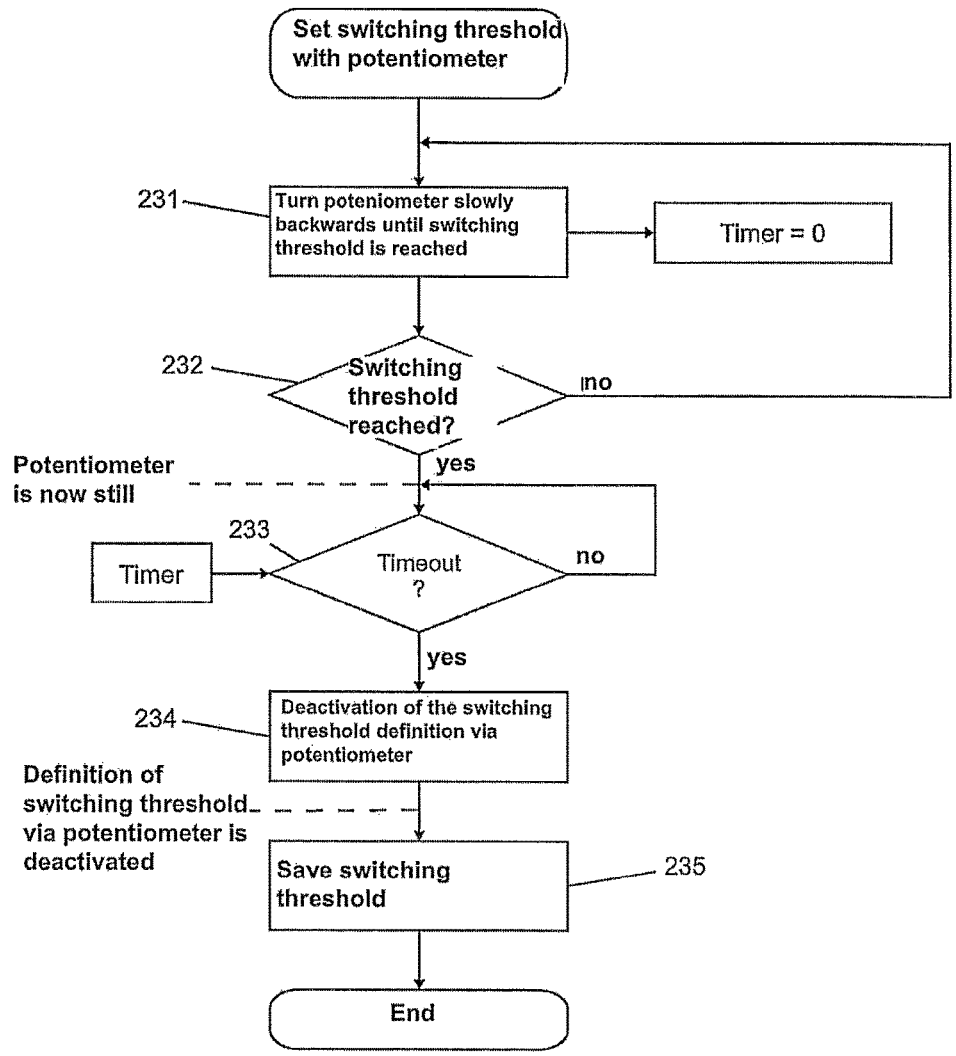
Fig. 2.3

METHOD AND CIRCUIT ARRANGEMENT FOR THE ACTIVATION AND PARAMETERIZATION OF AN ELECTRICAL DEVICE

CROSS REFERENCE TO RELATED APPLICATIONS

Applicant claims priority under 35 U.S.C. § 119 of German Application No. 10 2013 008 807.0 filed May 24, 2013, the disclosure of which is incorporated by reference.

BACKGROUND OF THE INVENTION

Field of the Invention

The invention relates to a method and a circuit arrangement for the activation and parameterization of an electrical device and the use of an electrical component for activating an electrical device.

Description of the Prior Art

For the purpose of protection from inadvertent actuation, sensors having a so-called teach-in button are provided with a time lock. In the case of the sensors provided by the applicant, a teach-in pushbutton needs to be pressed for a specific period of time such as three seconds for example before the teach-in functionality commences. "Teach-in" means specific configurations of the sensors, i.e. the input of boundary values, parameters and the like from the outside after its completion.

There are further sensors which allow parameterization via a so-called I/O-link interface. Some of these sensors also comprise a local parameterization feature in addition to the I/O-interface, e.g. a potentiometer. A large number of setting possibilities can be realized by the I/O-link interface. An I/O-link interface offers the possibility for example to assign a switching threshold directly as a value to a sensor. A "teach-in" via the I/O-link interface is also possible. If such a sensor also comprises a potentiometer in addition to an I/O-link interface in order to set switching thresholds for example, this can lead to synchronization problems of the two setting possibilities. If a new switching threshold is transmitted via the I/O-link interface for example and simultaneously the position of the potentiometer or a rotating actuator or even a linear actuator is maintained without any changes, the position of the potentiometer or the linear or rotary actuator no longer corresponds to the switching threshold after the transmission of the switching threshold by data transmission via the I/O-link interface or a successful I/O-link teach-in process. In this case, the linear actuator, rotary actuator or the potentiometer can no longer define the switching point.

SUMMARY OF THE INVENTION

The invention is now based on the object of further developing an electrical device such as a sensor of the kind mentioned above in such a way that effective protection from manipulation is provided. Protection from manipulation shall be understood in this respect as a protection from inadvertent actuation of the electrical component of such a sensor. Furthermore, synchronization shall be enabled between a setting of a value by means of the electrical component and a parameterization by means of I/O-link for example.

ADVANTAGES OF THE INVENTION

This object is achieved by a method and a circuit arrangement for activating an electrical device of the kind mentioned above by the features according to the invention. This object is also achieved by using an electrical component whose values are variable by rotating or displacing for example in order to activate such an electrical device.

It is the basic idea of the invention to use an electrical component with an analog or binary output signal, which is present anyway and whose values are variable by manipulation such as rotating, displacing, touching, pressing and the like, as a possibility for activating an electrical device. In this process, a first and a second threshold value are predetermined, which can be achieved for example by rotating or displacing or pressing, touching and the like of the electrical component. After reaching the first threshold value, a time window commences within which the second threshold value needs to be reached. If the second threshold value is reached within said time window, it is assumed that the activation shall occur and an activation signal is output. The adjustable electrical component is not only used for example for setting values of the electrical device, but also for activation and in addition—as will be explained below in closer detail—also for parameterization. If the second switching threshold is not reached within the predeterminable time window by manipulation of the electrical component, the activation process is terminated.

As a result of the measures mentioned in the dependent claims, advantageous further developments and improvements of the method stated in the independent claims and the circuit arrangement and the use of the electrical component are possible. One of the following components is appropriately provided as an electrical component: rotary actuator, linear actuator, rotary potentiometer, slide potentiometer, variable capacitor. All these components are suitable for setting different values by rotation or displacement, pressing or touching or other manipulations, wherein the values shall be understood as electrical signals which are output by the component in an analog or digital manner and which represent a rotary or linear position.

The time window is advantageously realized by means of a timer circuit. It is advantageously provided that upon reaching the first threshold value a first signal such as a light signal is output and that upon reaching the second threshold value within the predetermined time window a second signal is output. These signals signalize the successful activation of the electrical device. The electrical device is locked after prolonged non-actuation of the device.

The method in accordance with the invention can further be used for the parameterization of an electrical device. In this case, a final parameterization or determination of the (operating) mode of the electrical device such as a sensor can be achieved by respective setting of the electrical component by displacement or rotation in predetermined directions and about predetermined angles/lengths.

The use of an electrical component whose values are appropriately mechanically variable by rotation or displacement or even by pressing, touching etc (e.g. a potentiometer which changes its resistance value by rotation or displacement, or a rotary or linear actuator which enables different switching states by rotation or displacement) comes with the advantage that not only an activation but also a parameterization or determination of the mode of the electrical device comprising a sensor element for example is possible, which occurs even after its completion, i.e. in the cast state of the electrical device for example. An electrical component is used which is provided anyway for example for setting a switching value or the like. Additional provision of hardware is therefore not necessary.

The electrical device can be a sensor for example.

A large variety of sensors can principally be considered as sensors. Consequently, the sensor can be a proximity sensor or a distance sensor, i.e. a sensor which responds to the approach of an object or which determines the distance of an object. The sensor can also be a temperature sensor, a pressure sensor or a humidity sensor or another sensor for detecting physical quantities.

BRIEF DESCRIPTION OF THE DRAWINGS

Embodiments of the invention are shown in the drawings and are explained in closer detail in the description below, wherein:

FIGS. 2.1-2.3 show flowcharts of embodiments of the method in accordance with the invention;

DETAILED DESCRIPTION OF THE PREFERRED EMBODIMENTS

Figure 1:
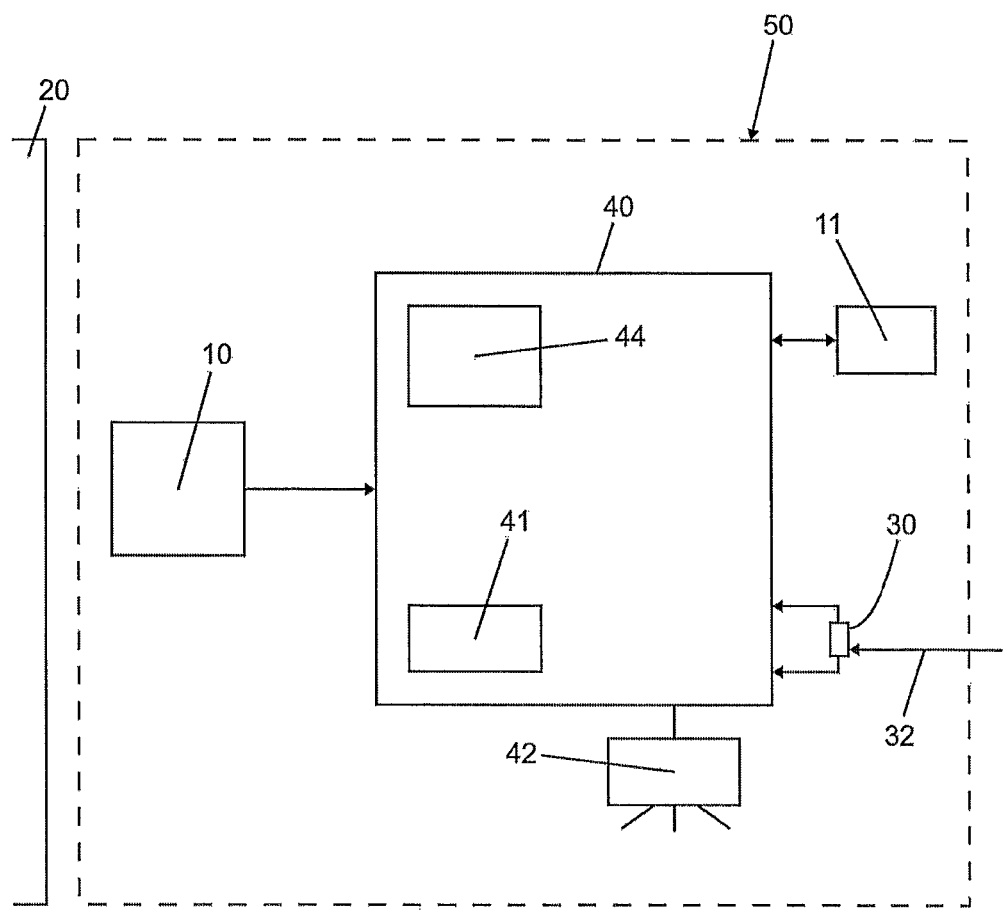
FIG. 1 schematically shows a circuit arrangement for activating an electrical device.

A circuit arrangement 40, which is shown in FIG. 1, comprises an I/O-link interface 11 for example, by means of which parameter data can be stored for example in a memory 44 of the circuit arrangement 40, which on its part is a part of an electrical device 50. The electrical device 50 further comprises a sensor element 10 for example which outputs a signal if the sensor (as shown for example) is a proximity sensor and a target 20 is arranged in front of said sensor. The invention will be described below in conjunction with such a proximity sensor. Notice must be taken however that the invention is not limited to a proximity sensor, but can principally be used in all sensors such as temperature sensors, pressure sensors or any other sensors which detect physical quantities.

The circuit arrangement 40 is used for the evaluation of the sensor signals and the control of the sensor element 10. The electrical device 50 further comprises an electrical component 30 whose values can be changed for example by rotating or displacing, pressing, touching or other manipulations. This component 30 can be a potentiometer for example which is adjustable from the outside, which is schematically symbolized by the line 32. The electronic circuit arrangement 40 also comprises a timer circuit 41, which will be described below in closer detail, and an LED 42 in addition to the evaluation device of the sensor output signals.

Figure 3:
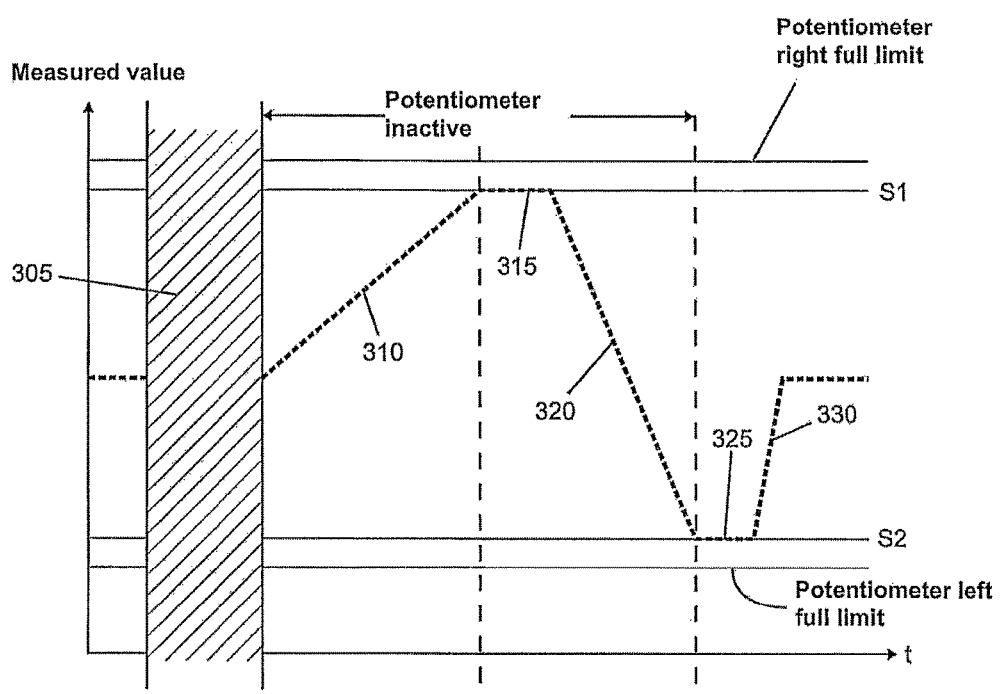
FIG. 3 respectively shows the setting value over time of a rotary potentiometer for explaining the method in accordance with the invention.

An embodiment of the method in accordance with the invention will be explained in conjunction with FIGS. 2 and 3 on the basis of setting a switching threshold of the electrical device 50.

The electrical device 50 is switched on or the supply voltage is activated at first in step 211. A switching threshold definition via the electrical component (potentiometer) 30 is inactive at first in step 212. The previous switching threshold is therefore read from the memory 44 in step 213. It is queried in step 214 whether switching threshold setting shall occur. If this is the case, a switching distance with respect to the target 20 is newly adjusted at first in a step 215. The switching threshold can be newly set via the electrical component 30 (which is a potentiometer in the present case) or in any other ways, e.g. by means of data transmission via the I/O-link interface 11. Otherwise, the current switching threshold is maintained. It is queried in step 216 whether switching threshold definition shall occur via the electronic component 30. If this is the case, the user performs an activation process at first in step 217 for applying the electrical component 30 for switching threshold definition. After the activation of the electrical component 30, it can be used in step 218 in order to define the switching threshold of the sensor element 10. Otherwise, a switching threshold is supplied in another way, e.g. on the basis of data transmission by means of the I/O-link interface 11 in step 21A (this region is designated with reference numeral 305 in FIG. 3), whereupon the switching threshold definition is deactivated via the potentiometer 30 in step 21B. The aforementioned method steps can be realized by a threshold value device arranged as a circuit for example or also as a computer program in a respective computer component.

FIG. 2.2 shows the method for activating the electrical component 30 for switching threshold definition of the sensor element 10. The electrical component in form of a rotary potentiometer 30 is twisted in step 221 towards a first threshold S1 (which is designated in FIG. 3 by the reference numeral 310). It is checked in step 222 whether threshold S1 has been reached. If it is determined in step 222 that the threshold S1 was reached (which is designated in FIG. 3 by reference numeral 315), a signal (e.g. a light signal) is output (step 223). The process is indicated by an LED 42 (yellow) which blinks for example and which signals the user that the switching threshold definition via the potentiometer 30 is now ready and expects further operation. The user has a predeterminable time window for further operation, for the measurement of which the timer is reset in step 224. The further operation is the continued rotation or reverse rotation of the potentiometer in step 225 (which is designated in FIG. 3 by reference numeral 320). It is checked in step 226 whether a second threshold S2 has been reached by reverse rotation of the potentiometer. If this is not the case, it is checked in step 229 whether a timeout has occurred, i.e. it is checked whether the time window provided for reaching the threshold S2 has expired. If the time window has expired without reaching the second threshold S2, the switching threshold definition of the electrical component 30 is deactivated again. If it is recognized in step 226 on the other hand that the second threshold S2 was reached within the time window, the electrical component 30 is comprehensively activated for switching threshold determination (step 227). This operating state is also signaled by a light signal of the LED 42 (step 228). The sensor is ready for setting the switching threshold by means of the electrical component, i.e. the potentiometer 30 in this case.

FIG. 2.3 shows the method for setting the switching threshold. The sensor is ready for setting the switching threshold with the potentiometer. In this case, the potentiometer is turned back slowly (step 231) (designated in FIG. 3 by reference numeral 330) until a switching threshold has been reached (step 232). As long as the potentiometer is switched for switching threshold definition, the time measurement of the timer 41 is reset continuously (step 233). If on the other hand the switching threshold is reached and the potentiometer is no longer rotated, the time measurement of timer 41 starts. If the potentiometer is activated and if the potentiometer is no longer used for a specific period of time, which is adjustable and predeterminable and is 1 to 5 minutes for example, the potentiometer is automatically deactivated (step 234). The value of the potentiometer is read out and is stored as a new switching threshold in the memory 44 of the switching arrangement (step 235).

Figure 4:
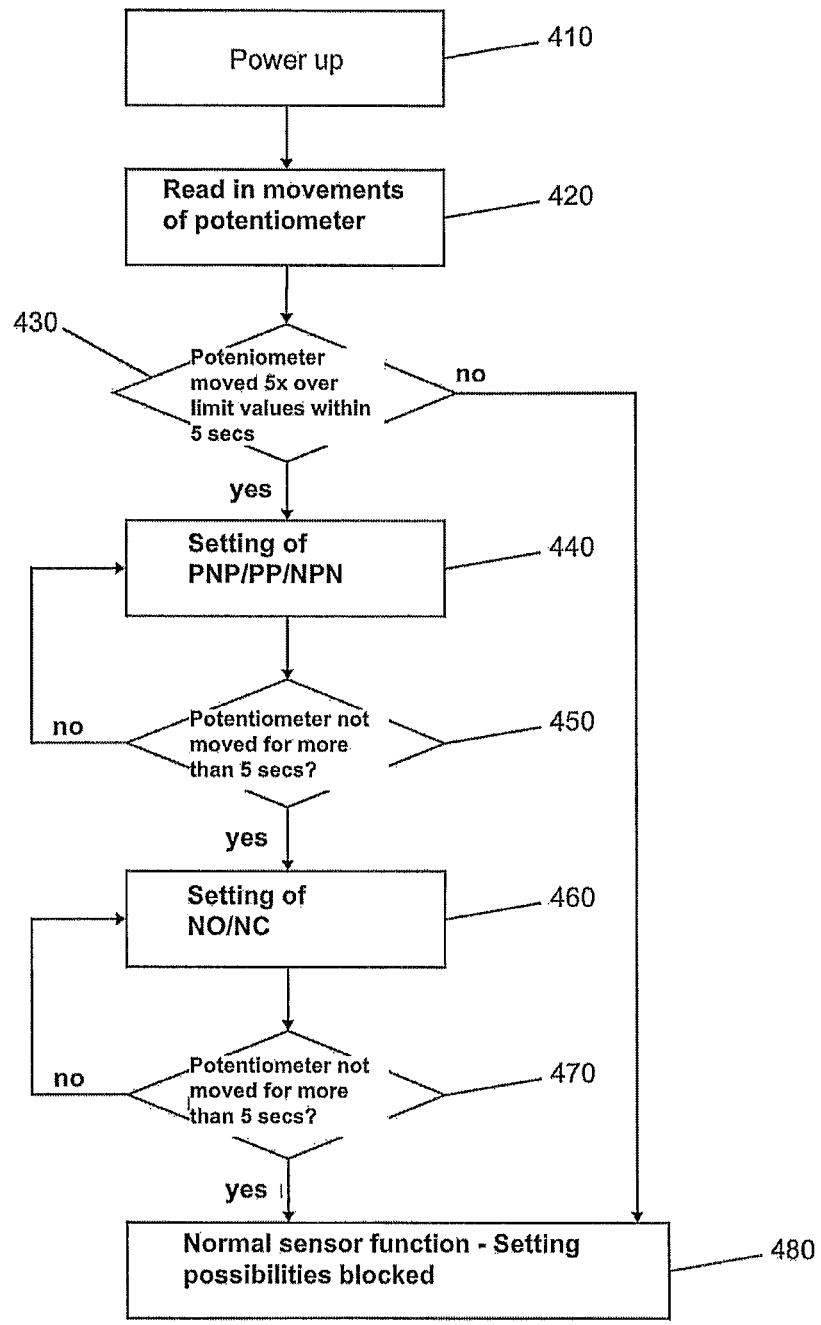
FIG. 4 shows a flowchart of an embodiment of the method in accordance with the invention for the parameterization and the mode determination of an electrical device in form of a sensor.

The electrical component 30, which is the potentiometer in this case, can also be used for the parameterization of the electrical device 50 or for determining its operating mode, e.g. whether the electrical device 50 is operated in a PNP/PP/NPN mode (PP=push-pull) or in an NC or NO mode. This will be described below in conjunction with FIG. 4. Power-up occurs at first in a step 410, which means power supply for the sensor 10. The movements of the electrical component 30 are then read in step 420 and it is checked in step 430 whether the electrical component 30 was twisted or moved five times in a predeterminable or predetermined (previously predetermined) time interval (in the example 5 seconds) above or beneath a respectively predeterminable or predetermined threshold. If this is the case, an activation of a potential PNP/PP/NPN programming is switched in step 440. It is checked in step 450 whether the potentiometer was no longer moved for 5 seconds for example. If this is not the case the system jumps back to step 440. If this is the case, setting of the NO/NC mode occurs in step 460. It is checked in step 470 again whether the potentiometer was not moved for 5 seconds for example. If this is the case, the set sensor function is accepted in step 480 and the setting possibility is blocked simultaneously. If this is not the case, the system jumps back to step 460 in which the setting of the (operating) mode occurs. These setting processes can be accompanied for example by blinking of the LED 42 or a signal of another signal device, so that the user can recognize the setting processes.

The advantage of the described method and the circuit arrangement and the use of the potentiometer or generally an electrical component for the activation and parameterization and determination of the operating mode is that even completed sensors can be activated from the outside, wherein it is not necessary to provide any additional switches or additional hardware such as a pushbutton, but rather an electrical component whose values are variable by rotation or displacement and which is actually used for setting a switching distance or sensor-specific values for example in order to activate the electrical device 50 or in order to parameterize said device or determine its operating mode.

What is claimed is:

1. A method for the activation of an electrical device, which comprises at least one electrical component whose values are mechanically variable by rotating, displacing, pressing, touching or other manipulations, comprising the following steps:
   - at least one first and one second threshold value are predetermined;
   - a time window starts after reaching the first threshold value by manipulation of the electrical component;
   - if the second threshold value is reached by manipulation of the electrical component within the time window, an activation signal is output;
   - if the second threshold value is not reached within the predeterminable time window by manipulation of the electrical component, the activation process is terminated; and
   - if the second threshold value is reached by manipulation of the electrical component within the time window, further manipulation of the electrical component to a switching threshold value, holding the electrical component at the switching threshold value for a specific period of time, reading out via the electrical device the switching threshold value as a new switching threshold, and storing the new switching threshold in a memory of the electrical device.

2. A method according to claim 1, wherein an element with binary or analog output signal is used as an electrical component, especially one of the following components: rotary actuator, linear actuator, rotary potentiometer, slide potentiometer, variable capacitor, slider, pushbutton, touch-sensitive switch element.

3. A method according to claim 1, wherein a first signal is output upon reaching the first threshold value and a second signal is output upon reaching the second threshold value within the predeterminable time window, and
   wherein the first signal comprises at least one of an optical signal, an acoustic signal, and an electrical signal, and the second signal comprises at least one of an optical signal, an acoustic signal, and an electrical signal.

4. A method according to claim 1, wherein at least one of a parameterization and a determination of the operating mode of the electrical device is carried out by rotating, displacing, pressing, touching or other manipulations of the electrical component in a predeterminable manner.

5. The method according to claim 1, wherein the first threshold value is reached by first manipulation in one direction and the second threshold value is reached by a second manipulation in the same direction.

6. The method according to claim 1, wherein the first threshold value is reached by first manipulation in one direction and the second threshold value is reached by a second manipulation in the opposite direction.

7. A circuit arrangement for the activation and parameterization of an electrical device, comprising:
   - at least one electrical component whose values are variable by rotating, displacing, pressing, touching or other manipulations;
   - a threshold value device which is set up to detect reaching at least two predeterminable or predetermined threshold values;
   - a timer circuit; and
   - a memory;
   - wherein the threshold values are reached by rotating, displacing, pressing, touching or other manipulations of the electrical component,
   - wherein upon reaching the first threshold value the timer circuit starts a predeterminable or predetermined time window,
   - wherein upon reaching the second threshold value the timer circuit outputs an activation signal within the predeterminable time window and releases a parameterization in form of a switch threshold setting and interrupts the activation upon exceeding the predeterminable or predetermined time window, and
   - wherein upon reaching the second threshold value by manipulation of the electrical component within the predeterminable or predetermined time window, further manipulation of the electrical component to a switching threshold value and holding the electrical component at the switching threshold value for a specific period of time allows the electrical device to read out the switching threshold value as a new switching threshold and to store the new switching threshold in the memory.

8. A circuit arrangement according to claim 7, wherein the electrical component is one of the following components: rotary actuator, linear actuator, rotary potentiometer, slide potentiometer, variable capacitor, slider, pushbutton, touch-sensitive switch element.

9. A circuit arrangement according to claim 7, wherein the electrical device is a sensor whose switching value is adjustable via the electrical component.

10. A circuit arrangement according to claim 9, wherein the sensor is a proximity sensor, a distance sensor, a temperature sensor, a pressure sensor or humidity sensor, or any other sensor for detecting physical quantities.

* * * * *